DEEP FAT PRESSURE COOKER

Original Filed July 11, 1966 5 Sheets-Sheet 1

INVENTORS.
ROBERT G. WILSON &
RAYMOND W. ROGERS
Bailey & Dority
ATTORNEYS

DEEP FAT PRESSURE COOKER

Original Filed July 11, 1966 5 Sheets-Sheet 2

INVENTORS.
ROBERT G. WILSON &
BY RAYMOND W. ROGERS
Bailey & Dority
ATTORNEYS

DEEP FAT PRESSURE COOKER

Original Filed July 11, 1966 5 Sheets-Sheet 3

INVENTORS,
ROBERT G. WILSON &
BY RAYMOND W. ROGERS
Bailey & Dority
ATTORNEYS

DEEP FAT PRESSURE COOKER

Original Filed July 11, 1966 5 Sheets-Sheet 4

INVENTORS.
ROBERT G. WILSON &
BY RAYMOND W. ROGERS
Bailey & Dority
ATTORNEYS

DEEP FAT PRESSURE COOKER

Original Filed July 11, 1966 5 Sheets-Sheet 5

INVENTOR.
ROBERT G. WILSON &
BY RAYMOND W. ROGERS
Bailey & Dority
ATTORNEYS

United States Patent Office

Re. 26,672
Reissued Sept. 30, 1969

26,672
DEEP FAT PRESSURE COOKER

Robert G. Wilson, 643 E. Faris Road, and Raymond W. Roger, 414 Potomac Ave., both of Greenville, S.C. 29605

Original No. 3,364,845, dated Jan. 23, 1968, Ser. No. 564,102, July 11, 1966. Application for reissue Aug. 16, 1968, Ser. No. 771,678
Int. Cl. A47j *37/12, 27/62*
U.S. Cl. 99—336 11 Claims

Matter enclosed in heavy brackets [ ] appears in the original patent but forms no part of this reissue specification; matter printed in italics indicates the additions made by reissue.

*ABSTRACT OF THE DISCLOSURE*

*A deep fat pressure cooker has a cover, a basket, a pot having a lower recess with heating means therein forming a central basket receiving space for accommodating a maximum amount of edibles, said cover having a conical lower surface, and means for automatically raising the cover and for fixing same in sealing position when pressure obtains in the pot.*

Figure 1:
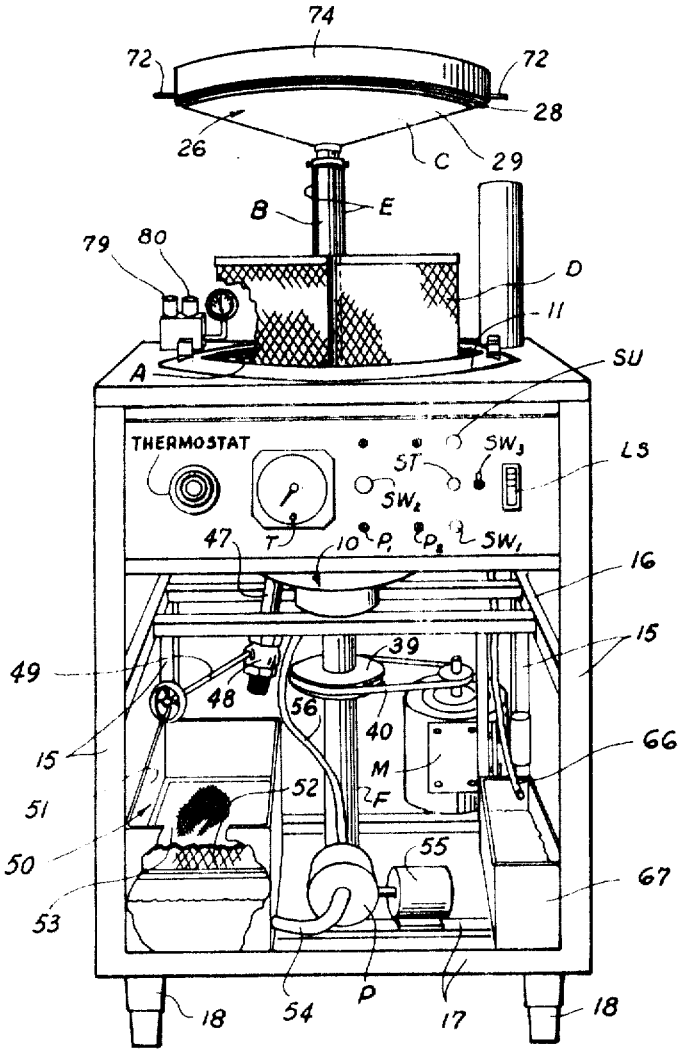

This invention relates to deep fat pressure cookers, and more particularly to an automatic cooker wherein an effective seal may be maintained between the cover and the pot, and wherein condensation upon the cover will flow down the cover into the pot to avoid contamination of the food and the exterior of the cooker. A preferred embodiment of the invention further contemplates easy loading of the food for uniform cooking.

Heretofore, deep fat pressure cookers have been constructed wherein, upon the completion of a cooking operation, it is necessary for the operator to open the cover and then remove baskets containing the edible being cooked from the hot grease. In loading such cookers it is necessary to place the edible in the baskets and then place the baskets manually into the grease and then close the cover manually. In many cooking establishments the operator must attend to other duties, as well as the operation of such cooker, so that it is likely that he might fail to remove the edible from the grease at the end of a desired cooking cycle causing the food to burn. While automatic deep fat pressure cookers have been provided, such have required the placing of the food in baskets prior to loading the machine, and otherwise have deficiencies which are remedied by devices constructed in accordance with the present invention as discussed below.

Accordingly, it is an important object of this invention to provide an automatic machine for cooking in deep fat under pressure which requires a minimum of operator attention.

Another important object of this invention is to provide an improved cover and basket arrangement whereby an effective seal might be maintained between the cover and the pot when pressure is maintained within the pot.

Another object of the invention is to avoid contamination of the machine and the cooked food by grease splattering and moisture drippings as the cover is raised.

Still another important object of the invention is to provide a cover and central shaft combination wherein the cover is provided with a guide for facilitating positioning and raising of the cover.

It is another important object of the invention to provide means for positioning the shaft and cover assembly and the edible supporting baskets carried thereby in an intermediate position wherein food may be placed in the basket after the basket is at least partially submerged in hot fat.

Still another important object of the invention is to provide a pot adapted to receive heating elements in a position to more uniformly heat the deep fat, and yet accommodate a maximum amount of edibles within the cooker.

Still another important object of the invention is to provide automatic means for raising the cover associated with mechanical means for insuring the safe raising of the cover which must be accomplished with the pressure off of the pot.

Yet another important object of the invention is to provide an improved system for filtering the grease within the pot for insuring cooking operations with a minimum of grease contamination for improved flavor.

The construction designed to carry out the invention will be hereinafter described, together with other features thereof.

Figures 2, 2A:
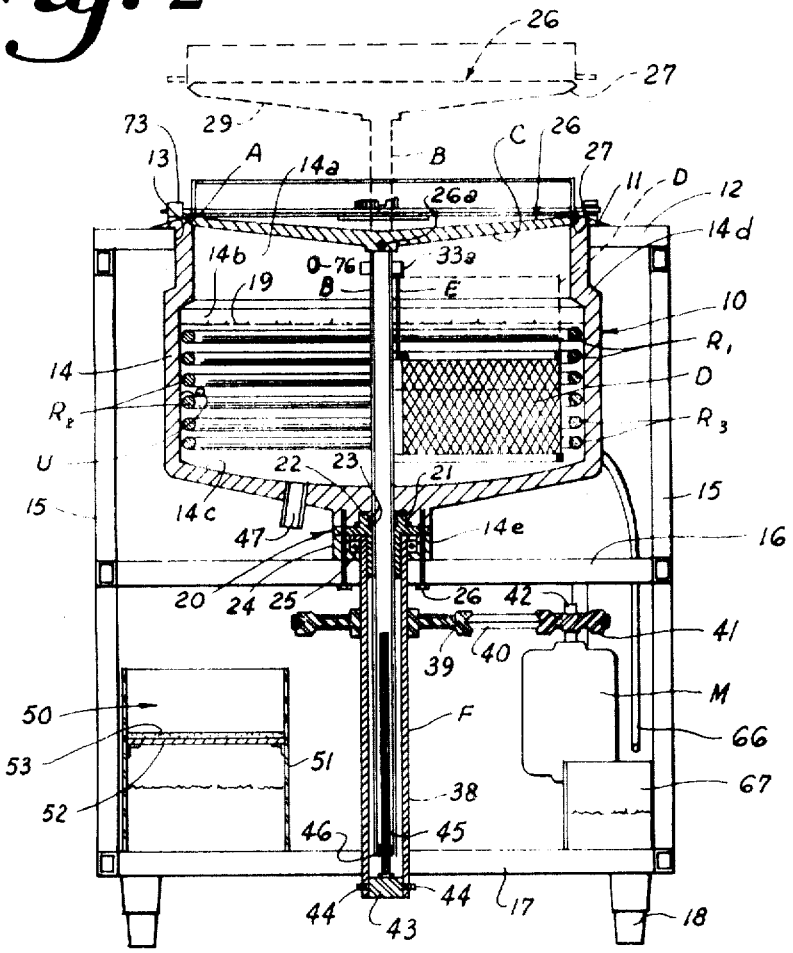
Figure 3:
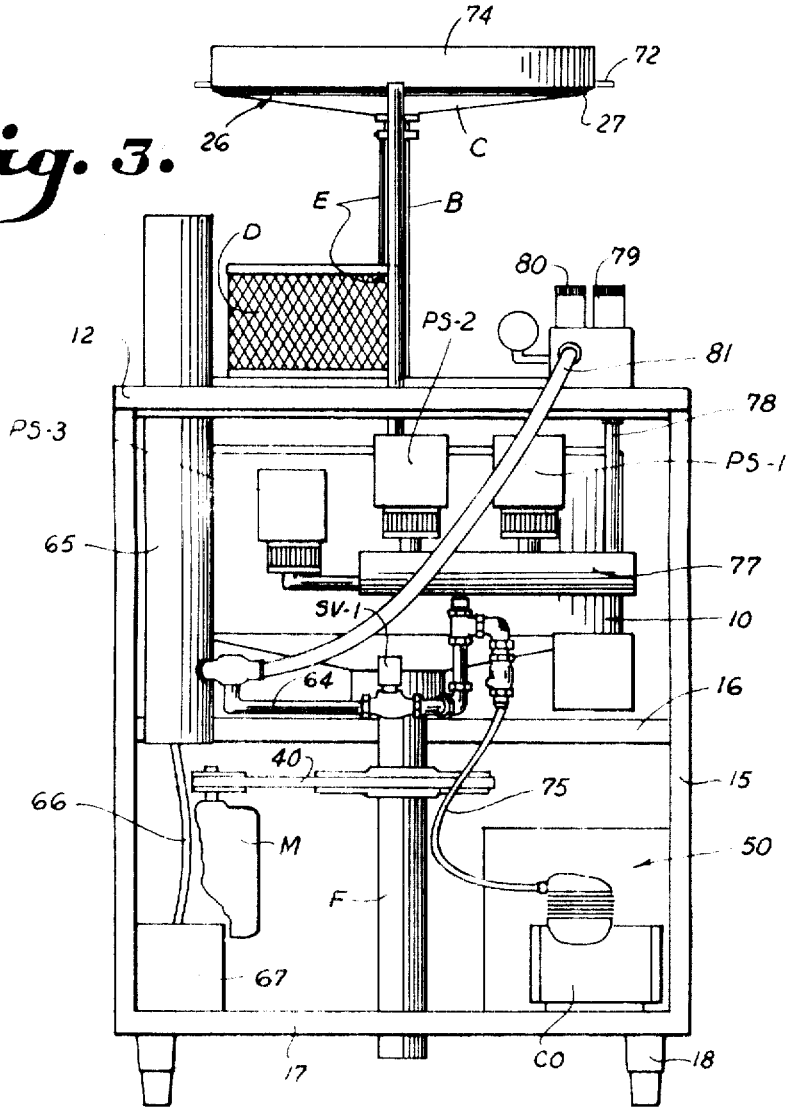
Figure 3A:
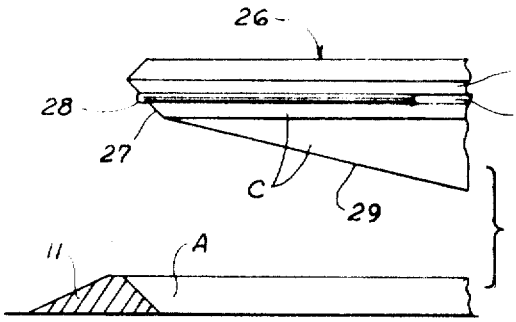
Figure 4:
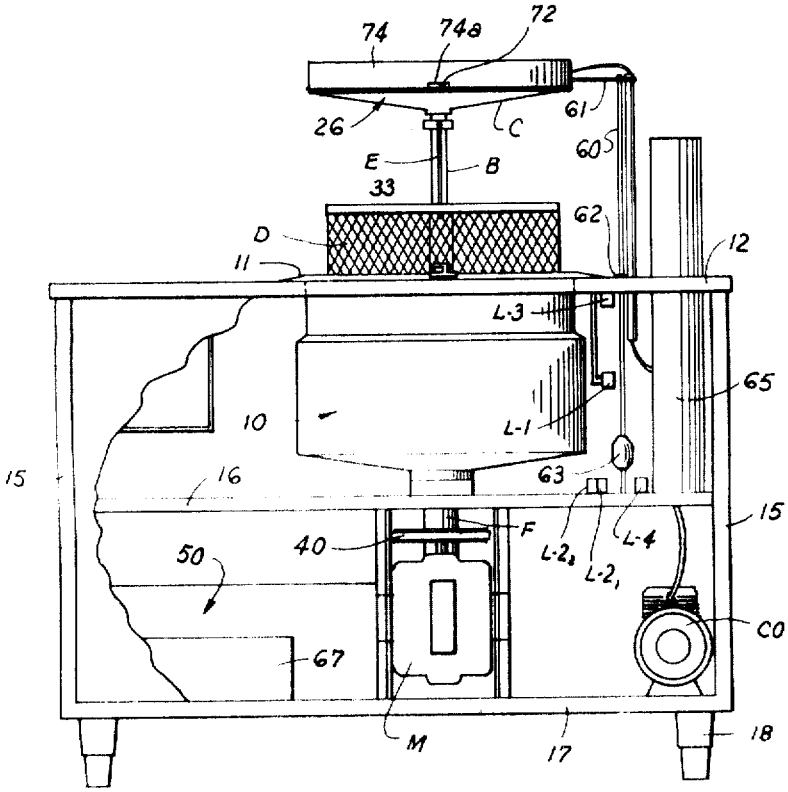
Figure 5:
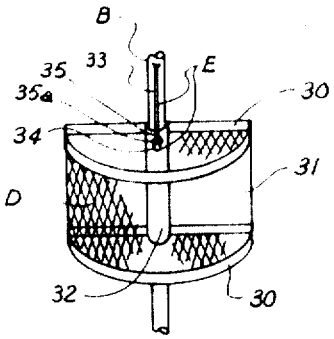
Figure 6:
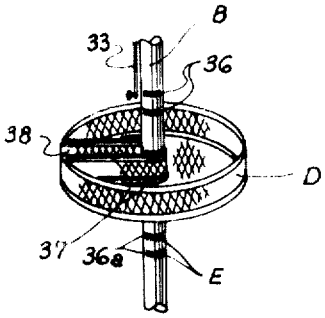
Figure 7:
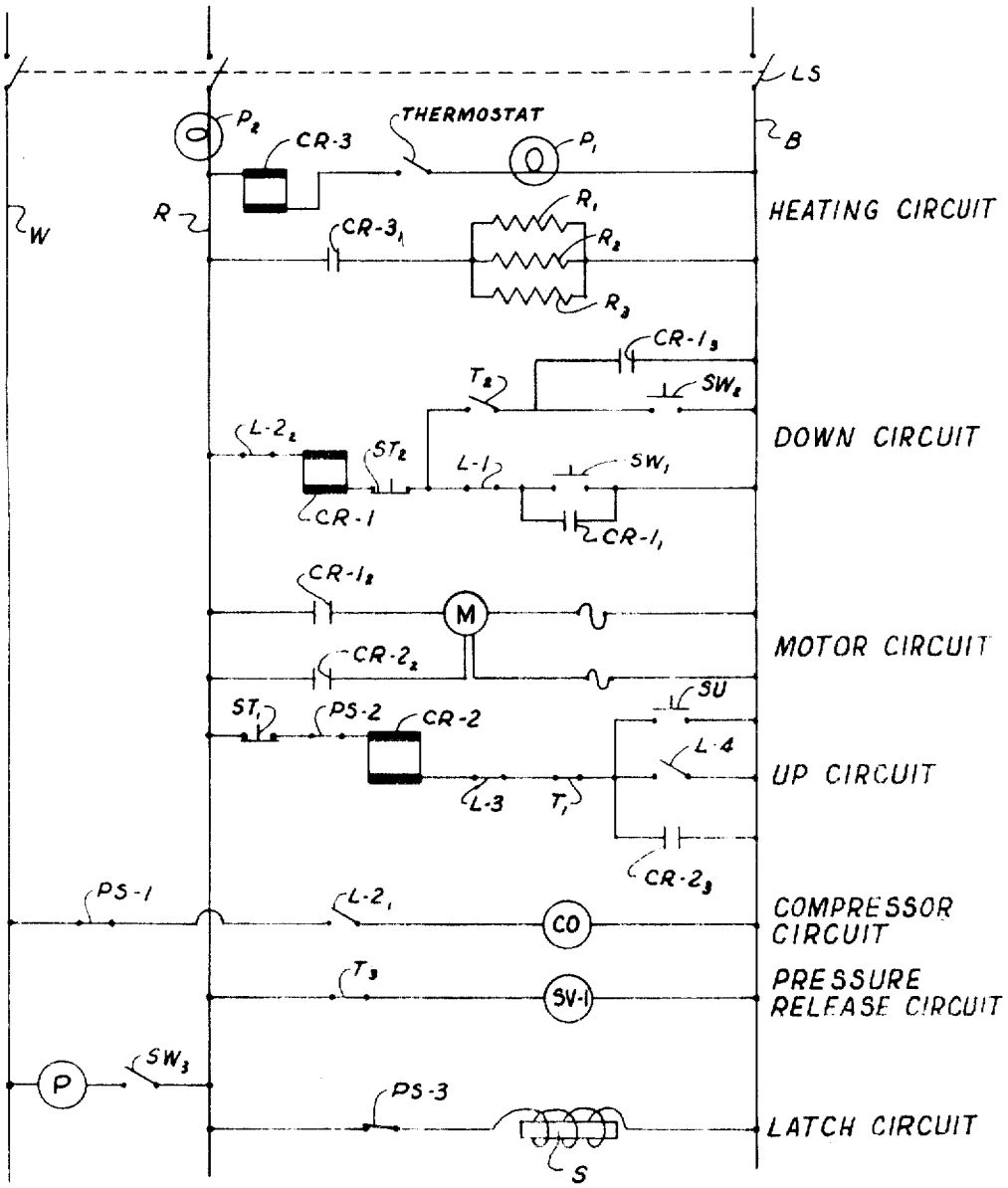

The invention will be more readily understood from a reading of the following specification and by reference to the accompanying drawings forming a part thereof, wherein an example of the invention is shown and wherein:

FIGURE 1 is a perspective view, with parts broken away, illustrating a deep fat pressure cooker constructed in accordance with the present invention, FIGURE 2 is a transverse sectional elevation further illustrating the device shown in FIGURE 1, FIGURE 2A is an enlarged perspective view illustrating the cover and associated parts, FIGURE 3 is a rear elevation of the preferred embodiment of the pressure cooker illustrated, FIGURE 3A is an enlarged transverse sectional elevation of the cover for the cooker, FIGURE 4 is a side elevation of the device taken from the right-hand side of FIGURE 1, FIGURE 5 is a perspective view illustrating the details of an edible support basket, FIGURE 6 is a perspective elevation of a modified form of an edible support basket, and FIGURE 7 is a schematic wiring diagram illustrating the operation of various electrical components.

The drawings illustrate a deep fat pressure cooker including a heated pot for containing hot cooking fat wherein, the pot has an opening in an upper portion thereof defined by an annular surface A which tapers inwardly downwardly from an upper portion thereof. A centrally disposed vertical shaft B has a lower portion extending through and below the pot. A substantially horizontal cover has a central connection on an upper portion of the vertical shaft. A lower surface C of the cover includes, a first conical marginal surface converging inwardly downwardly from an upper portion thereof complementary to the annular surface A of the opening in the pot, and a bottom surface defined by a second conical surface extending from a lower portion of the first conical marginal surface converging inwardly downwardly toward the shaft. A foraminous basket D is provided for carrying edibles. Mounting means E is carried on the shaft spaced below the cover for removably supporting the basket. Means F are connected to the lower portion of the shaft for raising the shaft from a position wherein the marginal surface of the cover is positioned adjacent the annular surface for effecting a seal therebetween to a position wherein the basket may be placed upon the mounting means, and for lowering the shaft to return the cover to effect such seal and place the basket and edibles therein into the hot fat. Thus, an effective uniform seal may be had between the cover and the pot, and condensation upon lower surface of said cover will flow downwardly thereof toward the shaft and be thence returned to the pot.

The heated pot is broadly designated at 10. An outwardly extending flange or rim 11 extends from the top thereof over the cabinet top 12 which has a circular opening 13 therein to accommodate a pot wall 14. A cabinet is formed by the top 12 which is carried by vertical members 15 illustrated as being positioned adjacent each corner thereof. The vertical members 15 carry an intermediate supporting portion 16 and a base portion 17. Suitable legs are illustrated at 18.

The pot 10 has an opening in the upper portion thereof which is defined by the annular outwardly tapering surface A. The pot wall 14 includes neck portion 14a (FIGURE 2) extending downwardly from the annular surface A. A recessed or enlarged wall portion 14b extends downwardly from the neck portion 14a and joins a dished out bottom portion 14c. The heating elements for the pot are illustrated in FIGURES 2 and 7 at $R_1$, $R_2$ and $R_3$. It will be observed that the heating elements are confined to the recessed portion of the tank defined by the wall portion 14b, so as to be spaced vertically within the pot to provide uniform heating for the cooking liquid 19 contained therein, and yet permit a maximum amount of edibles to be carried within the pot. Since the neck portion of the wall 14a extends inwardly of the heating elements, a protective shield is formed thereby against damage which might occur should a basket carrying edibles strike a heating element. It should be observed that the neck position 14a is joined to the recess portion 14b by an outwardly extending integral wall 14d.

The hollow vertical shaft B has a lower portion extending through said pot. The lower portion of the pot has a boss 14e which receives a bearing broadly designated at 20 for accommodating the shaft B. The bearing 20 is received within an annular bore 21 within the boss 14e and includes an upper portion 22 which is provided with O-rings 23 to provide an effective seal between the bearing and the vertical shaft B. The bearing 20 includes a lower housing section 24 which carries a ball bearing 25 therein. The lower portion 24 is held in place by the elongated screws 26 which extend upwardly into the boss. The bearing 25 serves as a part of the rotatable mounting for the shaft B used in raising and lowering the vertical shaft B as will be described below.

The cover broadly designated at 26 has a lower surface C which includes a first conical marginal surface 27 which converges inwardly downwardly from an upper portion thereof complementary to the annular surface A defining the opening in the pot. The surface 27 is grooved as at 27a to accommodate an O-ring 28 in an intermediate portion thereof, and a bottom surface 29 extends therefrom in the form of a second conical surface and converges inwardly downwardly toward the shaft B which is suitably connected thereto as by the setscrew 26a (FIGURE 2) or as by welding (not shown). The first conical surface 29 and second conical surface 29 could be continuous rather than broken so long as a suitable surface is provided for snug engagement with the upper rim 11 of the pot and to guide the condensation upon the lower surface C toward the central of the pot to avoid contaminating food within the baskets and to avoid splashing grease and water over the top of the cooker. Preferably, the surface 29 is unobstructed and smooth to further facilitate the passage of condensation thereon.

It will be observed that the baskets D are preferably spaced considerably below the lower surface C of the cover to avoid obstruction so that unobstructed access is provided for dropping the edibles within the baskets D. Thus, with the basket D in an intermediate position, as illustrated in broken lines in FIGURE 2, with the lower portion of the basket submerged in the grease 19, part of the edibles may be added at a time to avoid sticking together during cooking. For example, in the case of fried chicken, it is desirable that the pieces be placed separately within the basket to prevent them from sticking together during the cooking process. During the cooking process the pressure developed in the pot seals the edible and keeps in the juices and adjoining pieces to be sealed together in the process. This is avoided by sealing the outside of each piece as it is thus added. It will be observed that FIGURE 1 shows the shaft B and the basket carried thereby in fully raised position for unloading baskets or in position having just received the baskets. FIGURE 2 in full lines illustrates the baskets in cooking position.

The baskets D (FIGURE 5) are constructed from expanded metal or other suitable foraminous material. Such basket, according to a preferred embodiment, includes a pair of vertical spaced semi-circular frame members 30 with extended metal 31 therebetween. A semi-circular vertical support 32 is carried by the frame members 30 to be received upon the shaft B and the mounting means E carried thereby.

The baskets are positioned upon mounting means E, which preferably includes a depending rod 33 mounted upon a collar 33a which has suitable mounting (not shown) upon the shaft E. The vertical rod carries a projecting head 34 which is carried in spaced relation to the rod 33 upon a connecting shank (not shown) which thus mounts the head upon the rod. The head 34 is accommodated within an enlarged portion 35a of a narrow vertical slot 35 within the vertical support 52. Such an arrangement might best be used in an establishment where large quantities of food of limited kinds, such as French fries and chicken, are to be cooked at one time in the opposed relatively deep baskets.

A modified form of basket support E is illustrated in FIGURE 6 wherein vertically spaced pairs of aligned indentions 36 conform to vertically spaced aligned U-shaped frame members 37 of the relatively shallow basket D. The U-shaped frame members define an opening 38 so the basket may be received upon the vertical shaft B and positively positioned thereon with a minimum of operator effort. Preferably, the indentions 36 do not pass entirely about the shaft B but are placed on opposite sides thereof to prevent the circular baskets D illustrated in FIGURE 6, from turning thereon because of the stops 36a thus formed. As illustrated, several vertically spaced baskets may thus be carried upon the shaft B. Since limited amounts of edibles would be pre-loaded in each basket the stiking problem referred to above would be avoided. Such basket arrangement would be especially useful in restaurants where several kinds of food, such as steaks, chicken, fish, etc., may be loaded in respective baskets and cooked at one time.

Means F is connected to the lower portion of the shaft B for raising and lowering the shaft. The means F includes a hollow cylindrical member 38 (FIGURE 2) which has an upper flange 39 which is carried for rotation by the ball bearing 25. The cylindrical member 38 has a sheave 39 (FIGURES 1 and 2) mounted in fixed position thereon. The sheave 39 is driven by the belt 40 which is in turn driven by a sheave 41 carried by the power take-off shaft 42 of the motor M. The hollow cylindrical member 38 carries a plug 43 fixed therein by setscrews 44. The plug carries a vertical threaded member 45 which is received within an internally threaded plug 46 which is carried within the lower portion of the hollow shaft B and suitably secured therein as by welding (not shown). The direction of the motor M may be reversed for raising and lowering as described below.

It will be observed that an outlet pipe 47 is provided in the dished out bottom portion 14c and that a valve fitting 48 may be secured therein releasing the grease within the pot into a suitable filter element broadly designated at 50. The valve has a suitable operating handle 49. The filter 50 includes an open tank 51 having a horizontal support 52, preferably of expanded metal, positioned in an intermediate portion thereof, and a porous filter 53 is positioned above. The grease is collected within the lower portion of the tank 51 and recirculated through the line 54 by the pump P, which includes a suitable motor 55 (FIGURE 1). From the pump P the grease may pass through the line 56 into the pot 10 through a suitable opening (not shown) in the upper portion of the pot.

Operation

Starting with the shaft B in fully raised position as shown in FIGURE 1 and with the baskets positioned upon the mounting means E, the operator first closes the circuit breaker LS located on the front panel of the machine to energize the circuitry. Referring to FIGURES 1 and 7, it will be noted that if the operator then depresses the down or start switch $SW_1$, power will be placed on control relay CR–1. Such energization causes contacts CR–$1_1$ to close sealing in a circuit around the start switch $SW_1$. The control relay contacts CR–$1_2$ are in series with the motor M so that the cover 26 will be lowered thereby. A depending rod 60 (FIGURE 4) is carried by the cover and is suitably fastened thereto as by the link 61. The rod extends downwardly through a guide 62 within the cabinet top 12 and carries a cam 63 adjacent the lower end thereof. The cam or abutment 63 opens the normally closed microswitch L–1 to de-energize control relay CR–1 causing contacts CR–$1_1$ and CR–$1_2$ to open stopping the motor.

The baskets D are now in intermediate position, as illustrated in broken lines in FIGURE 2, for loading edibles thereon as described above. The operator sets the normally open timer T, opening contacts $T_1$ and $T_3$ and closing contacts $T_2$, and depresses the down switch $SW_2$ placing power on the control relay CR–1 causing contacts CR–$1_2$ to again be closed energizing the motor M. Simultaneously contacts CR–$1_3$ are closed sealing in the circuit around $SW_2$ thus completing the circuit across B and R leads through contacts CR–$1_3$, timer contacts $T_2$, relay CR–1 and limit switch L–$2_2$. The motor is now running causing the top 26 to be lowered until the cam 63 strikes the microswitch L–$2_2$ opening same. When the microswitch L–$2_2$ is opened the control relay CR–1 is de-energized causing contacts CR–$1_2$ in the motor circuit to open stopping the motor M. The microswitch L–$2_1$ was also closed by the cam 63 and this completed a circuit between leads W and B to a compressor CO through a normally closed pressure switch PS–1 (FIGURE 3) energizing the compressor until a predetermined pressure is built-up in the pot 10, as described below, at which time PS–1 opens the compressor circuit.

The thermostat has been previously set a sufficient time to cause the fat to heat to the desired temperature. To accomplish this the thermostat, which is connected in series with control relay CR–3, causes contacts CR–$3_1$ to close energizing the Calrod heating elements $R_1$, $R_2$ and $R_3$ when the temperature drops below a preset level as determined by the sensing bulb U within the pot (FIGURE 2).

The cooking operation continues until the timer T times out and two sets normally closed contacts $T_1$ and $T_3$ are closed. The timer contacts $T_1$ cause the circuitry to control relay CR–2 to be partially completed. The closing of contacts $T_3$ causes solenoid valve SV–1 to be energized which permits air and vapor to escape from the pot through the line 64 into the condensation chamber 65. From the condensation chamber the condensate passes through the line 66 into a receptacle 67.

When the pressure drops to "zero" a safety pressure switch PS–2 is closed completing the circuit to control relay CR–2 through the timer contacts $T_1$ and the closed microswitch L–4 which was previously closed by the cam 63.

The top must now be raised at the completion of the cooking operation and when control relay CR–2 is energized contacts CR$2_2$ are closed energizing the circuit to the motor causing the motor to run in a clockwise direction raising the cover and shaft assembly. The contacts CR–$2_3$ close acting as a sealing circuit about the microswitch L–4. The motor runs until the limit switch L–3 is opened by contact with the cam 63 in raised position.

The contacts of switch L–3 cause control relay CR–2 to be opened.

It should be noted that by depressing the switch $ST_1$ the shaft B may be stopped in any desired position by the opening of its contacts $ST_1$ and $ST_2$ in the up and down circuits, respectively. By depressing switch $SW_1$ the shaft may then be lowered or by pressing the switch SW the shaft may be raised. The pilot light $P_1$ shows power on the thermostat, while the pilot light $P_2$ shows power on the circuit. By closing the switch $SW_3$ the pump will be energized to filter the fat in the pot as described above.

Safety latch

FIGURE 2A illustrates a safety latching mechanism operated by a pressure sensitive switch PS–3 (FIGURES 3 and 7). The switch PS–3 is set to actuate a solenoid S mounted in the central portion of the cover 26 when the pressure reaches a safe level but has not yet quite returned to "zero" (atmospheric). A horizontal plate 68 is pivoted as at 69. A spring 70 has connection on one end as at 70a with the plate and on the other end as at 70b to the cover and urges the plate to push in the core of the solenoid S through linkage 71 carried by the plate. A rod 72 is carried by the plate 68 and is positioned in locking position beneath the latch members 73. When the pressure falls below the safe level the solenoid is actuated extending its core against the force of the spring 70 to move the latch arm 72 into released position. A cover 74 is provided to house the solenoid S and associated parts. Slots as illustrated at 74a (FIGURE 4) are provided to accommodate the ends of the rod 72.

If desired, the latch mechanism described above could be constructed to close responsive to actuation by a solenoid such as the one illustrated at S. If this is done the spring would be attached to the opposite side of the plate to normally urge the rod 72 to open position rather than closed position as illustrated. The switch PS–3 in such situation would be normally open and would close when the pressure in the pot exceeded said safe level to actuate the solenoid.

It should be noted that the compressor CO introduces air into the pot through the line 75 through the opening 76 within the pot. Such air also passes through a manifold 77, communicating with the opening 76, and which carries the valves PS–1, PS–2 and PS–3. The manifold is connected through a line 78 to a pair of pressure relief valves 79 and 80. One of these pressure relief valves is calibrated to open at a pressure slightly above the desired cooking pressure within the pot for safety purposes preventing an excessive build-up of pressure as might occur if the compressor is not properly deactivated at the level for which the pressure sensitive switch PS–1 is set. The line 81 from valves 79 and 80 delivers the air to the release condenser 65. The second valve 80 is simply an additional safety factor and is calibrated to open at a slightly higher pressure than the valve 79.

While a preferred embodiment of the invention has been described using specific terms, such description is for illustrative purposes only, and it is to be understood that changes and variations may be made without departing from the spirit or scope of the following claims.

What is claimed is:

1. A deep fat pressure cooker comprising, a heated pot for containing hot cooking fat, said pot having an opening in an upper portion thereof defined by an annular surface which tapers inwardly downwardly from an upper portion thereof, a centrally disposed vertical shaft having a lower portion extending through and below said pot, a substantially horizontal cover having a central connection on an upper portion of said vertical shaft, said cover including, a first conical marginal surface converging inwardly downwardly from an upper portion thereof complementary to said annular surface of the opening in the pot and a bottom surface of said cover defined by a second conical surface extending from a lower portion of said first conical marginal surface converging inwardly downwardly toward said shaft, a foraminous basket for carrying edibles, mounting means carried on said shaft spaced below said cover for removably supporting said basket, and means connected to said lower portion of the shaft for raising said shaft from a position wherein the marginal surface of the cover is positioned adjacent said annular surface for effecting a seal therebetween to a position wherein said basket may be placed upon said mounting means and for lowering the shaft to return the cover to effect such seal and place the basket and edibles therein into the hot fat, whereby an effective uniform seal may be had between the cover and the pot, and whereby condensation upon lower surface of said cover will flow down the second conical surface toward the shaft and be thence returned to the pot.

2. The structure set forth in claim 1 including, a vertical guide for said vertical shaft, whereby said cover and shaft will be guided during raising and lowering thereof.

3. The structure set forth in claim 1, wherein said mounting means includes an enlarged head carried by said vertical shaft in fixed spaced relation thereto, and said basket has a slot for receiving said head.

4. The structure set forth in claim 1, wherein said mounting means includes spaced aligned indentions in said shaft, and said basket has spaced aligned members to be received in said indentions.

5. The structure set forth in claim 1 including, means for discharging the fat from said pot, a filter for receiving the fat thus discharged, and a pump returning the fat from the filter into the pot.

6. A deep fat pressure cooker comprising: a pot for containing hot cooking fat including; an opening in an upper portion thereof defined by an annular surface which tapers inwardly downwardly from an upper portion thereof; a centrally disposed vertical shaft having a lower portion extending through and below said pot; a substantially horizontal cover having a central fixed connection on an upper portion of said vertical shaft; said cover including; a first conical marginal surface converging inwardly downwardly from an upper portion thereof complementary to said annular surface of the opening in the pot, and a bottom surface of said cover defined by a second conical surface extending from a lower portion of said first conical marginal surface converging inwardly downwardly toward said shaft; a foraminous basket for carrying edibles; mounting means carried on said shaft spaced below said cover for removably supporting said basket; said pot further including, a lower recessed portion, and a plurality of vertically spaced heating elements carried in said recessed portion; and means for raising said shaft from a position wherein the marginal surface of the cover is positioned adjacent said annular surface for effecting a seal therebetween to a position wherein said basket may be placed upon said mounting means and for lowering the shaft to return the cover to effect such seal and place the basket and edibles therein into the hot fat; whereby an effective uniform seal may be had between the cover and the pot, and whereby condensation upon lower surface of said cover will flow down the second conical surface toward the shaft and be thence returned to the pot.

7. A deep fat pressure cooker comprising, a heated pot for containing hot cooking fat, said pot having an opening in an upper portion thereof, a cover for said pot, vertical shaft means for raising and lowering said cover connected to said cover so as to form an assembly therewith, power operated means positioned below the opening in said pot for raising and lowering said assembly, a foraminous edible carrying basket carried by said assembly having an opening therein spaced below said cover, mounting means for positioning said basket upon said assembly, first power control means for positioning said assembly in fully raised position wherein said basket may be removed from and placed upon said mounting means, second power control means including a switch for positioning said assembly in an intermediate position wherein a lower portion of the basket is submerged in the hot cooking fat for receiving edibles placed therein part at a time, said basket being positioned substantially below said cover for receiving edibles into the basket when said basket is positioned upon said assembly to avoid said edibles from sticking together, and third power control means for positioning said assembly in fully closed position wherein said cover is closed over the opening in the pot and said basket is further lowered into the cooking fat for cooking under pressure.

8. The structure set forth in claim 7, wherein said shaft means is a centrally disposed shaft passing through the pot, and wherein said basket is carried by the shaft.

9. A deep fat pressure cooker comprising, a heated pot for containing hot cooking fat, said pot having an opening in an upper portion thereof, a cover for said pot, a vertical shaft for raising and lowering said cover connected to said cover so as to form an assembly therewith, power operated means positioned below the opening in said pot for raising and lowering said assembly, a foraminous edible carrying basket carried by said assembly, means for building up air under pressure in said pot when said cover is closed over said opening, a fixed latch carried in fixed relation to said pot, a movable member engaging said fixed latch carried in fixed relation to said assembly, a solenoid mounted adjacent to said movable member, and a pressure sensitive switch operating responsive to pressure conditions within the pot connected to said solenoid to cause said solenoid to move and disengage said movable member from said fixed latch, whereby the movable member engages the said fixed latch positively maintaining the cover in closed position when pressure conditions obtain within the pot making it dangerous to raise the cover.

*10. A deep fat pressure cooker comprising: a pot for containing hot cooking fat including; an opening in an upper portion thereof; a substantially horizontal cover; a foraminous basket for carrying edibles; said pot further including, an upper neck portion accommodating the basket, a lower recessed portion, an outwardly extending integral wall joining the neck portion to the lower recessed portion, a bottom, and spaced heating means carried in said recessed portion so as to form a central basket receiving space within said recessed portion; and means for raising said cover from a position wherein the cover is positioned adjacent said upper neck portion for effecting a seal therebetween to a position wherein said basket may be placed with the edibles therein through the neck portion into the hot fat and within said basket receiving space; whereby the heating means is positioned to more uniformly heat the deep fat, and yet accommodate a maximum amount of edibles within the cooker.*

*11. The deep fat pressure cooker set forth in claim 10, wherein said upper neck portion, said lower recessed portion, said integral wall and said cover are annular; and wherein said cover includes a bottom surface having a conical surface converging inwardly and downwardly; whereby condensation upon the lower surface of said cover will flow down the conical surface.*

References Cited

The following references, cited by the Examiner, are of record in the patented file of this patent or the original patent.

UNITED STATES PATENTS

| | | | |
|---|---|---|---|
| 1,986,115 | 1/1935 | Offenhauser | 99—349 |
| 1,993,507 | 3/1935 | Flegel | 49—2 X |
| 2,191,275 | 2/1940 | Fink | 99—407 X |
| 2,408,248 | 9/1946 | Barber | 99—336 X |
| 2,427,564 | 9/1947 | Le Claire. | |

(Other references on following page)

UNITED STATES PATENTS

| | | | |
|---|---|---|---|
| 2,568,792 | 9/1951 | Cripps | 99—407 X |
| 2,635,628 | 4/1953 | Stamper | 137—525 X |
| 2,700,724 | 1/1955 | Lynch | 219—433 |
| 2,756,321 | 7/1956 | Pappas | 99—403 X |
| 2,914,063 | 11/1959 | Wagner | 126—381 |
| 2,938,648 | 5/1960 | Phelan et al. | 220—57 X |
| 3,187,664 | 6/1965 | Jennings | 99—329 |
| 3,209,673 | 10/1965 | Howard | 99—251 |
| 3,217,633 | 11/1965 | Anetsberger | 99—408 X |

| | | | |
|---|---|---|---|
| 3,225,681 | 12/1965 | Wells | 99—336 |
| 2,778,736 | 1/1957 | Wagner. | |

FOREIGN PATENTS

| | | |
|---|---|---|
| 965,462 | 7/1964 | Great Britain. |
| 168,100 | 8/1959 | Sweden. |

BILLY J. WILHITE, Primary Examiner

U.S. Cl. X.R.

49—2; 99—337, 342, 407, 408; 292—201, 214, 259